United States Patent [19]

Bernert et al.

[11] 3,997,626

[45] Dec. 14, 1976

[54] ANTISTATIC POLYAMIDE COMPOSITIONS

[75] Inventors: Klaus-Rüdiger Bernert; Eduard Radlmann; Günther Nischk, all of Dormagen, Germany

[73] Assignee: Bayer Aktiengesellschaft, Leverkusen, Germany

[22] Filed: June 30, 1975

[21] Appl. No.: 591,633

Related U.S. Application Data

[63] Continuation of Ser. No. 420,371, Nov. 30, 1973, abandoned.

[30] Foreign Application Priority Data

Dec. 2, 1972 Germany .......................... 2259104

[52] U.S. Cl. ..................... 260/857 TW; 260/75 N; 260/857 PE
[51] Int. Cl.² ........................................ C08L 77/12
[58] Field of Search ............. 260/857 TW, 857 PE, 260/857 PEO

[56] References Cited

UNITED STATES PATENTS

| | | | |
|---|---|---|---|
| 3,636,135 | 1/1972 | Garforth | 260/857 PE |
| 3,839,245 | 10/1974 | Schlossman | 260/857 PE |

*Primary Examiner*—Paul R. Michl
*Attorney, Agent, or Firm*—Plumley and Tyner

[57] ABSTRACT

The invention relates to polyamide compositions of high-molecular weight, linear aliphatic polyamides with reduced surface resistance which are produced by solvent-free condensation of salts of aliphatic diamines and aliphatic dicarboxylic acids and/or of lactams and in which polyester amides which have been obtained by condensation of dicarboxylic acids or their derivatives, diols and primary-secondary aliphatic diamines are homogeneously distributed.

10 Claims, No Drawings

ANTISTATIC POLYAMIDE COMPOSITIONS

This is a continuation of application Ser. No. 420,371, filed Nov. 30, 1973 now abandoned.

This invention relates to polyamide compositions of high-molecular weight, linear aliphatic polyamides with reduced surface resistance which are produced by solvent-free condensation of salts of aliphatic diamines and aliphatic dicarboxylic acids and/or of lactams and in which polyester amides which have been obtained by condensation of dicarboxylic acids or their derivatives, diols and primary - secondary aliphatic diamines are homogeneously distributed.

It is known that shaped products such as polyamide foils, fibres and panels have the property of becoming electrostatically charged in use owing to their exceptionally high surface resistance. In the case of floors and carpets made of synthetic polymers, this manifests itself in the form of electric shocks which are particularly pronounced in heated rooms when the outside temperature is low because of the low atmospheric humidity which then prevails. The tendency to become electrostatically charged also severely restricts the use of synthetic resins in technical fields on account of the resulting increased attraction of dust and risk of fire when handling inflammable solvents.

Numerous chemical compounds are known which when applied to the surface or incorporated in the polymer, especially in the case of fibres, are capable of reducing the surface resistance to such an extent that no trouble due to electrostatic charging arises in normal use. In the case of fibres, this reduction in surface resistance is required to be permanent, i.e. the antistatic effect should persist even after numerous washings. Antistatic agents which contain polyethers have been almost exclusively used in the past because they are very efficient even in small quantities. However, the polyether content in the fibres gives rise to discolouration due to oxidation in the presence of light and heat. There has therefore been a demand for antistatic agents which are free from polyethers and which would be equally effective without having these disadvantages.

Polyamide compounds which contain low-molecular weight polyamides with tertiary amide groups as the effective constituents are already known (see e.g. German Offenlegungsschrift No. 1,794,167).

This invention relates to an antistatic polyamide composition which comprises an aliphatic polyamide and 1–30 percent by weight, based on the polyamide composition, of a polyester amide which has recurrent structural units of the following general formulae $$\left[\begin{array}{c}-C-R_1-C-R_2-\\ \parallel\quad\quad\parallel\\ O\quad\quad O\end{array}\right] \text{ and } \left[\begin{array}{c}-C-R_1-C-R_3-\\ \parallel\quad\quad\parallel\\ O\quad\quad O\end{array}\right]$$

in statistical distribution,
wherein $R_1$ represents a single bond, a straight chain or branched chain alkylene group, a cycloalkylene group or an arylene group, $R_2$ represents $$-O-CH_2-\hexagon{H}-CH_2-O-,\quad -O-\hexagon{H}-CH_2-\hexagon{H}-O-$$

$$-O-\hexagon{H}-\underset{CH_3}{\overset{CH_3}{C}}-\hexagon{H}-O-\quad -O+(CH_2-CH_2-O)_z+,$$

$$-O+(CH_2-CH_2-CH_2-CH_2-O)_z+$$

or groups of the general formulae $$-O-R_4-O- \text{ and } -(O-CH_2-CH_2)_y-NH-R_5-\underset{\underset{R_6}{|}}{N}-(CH_2-CH_2-O-)_y$$

wherein $R_4$ represents a straight chain or branched chain alkylene group or a 1,4-cyclohexylene group, $R_5$ represents a straight chain or branched chain alkylene group containing 2 to 20 carbon atoms in which the chain may also contain tertiary nitrogen atoms, $R_6$ represents a short chain, straight or branched alkyl group with 1 to 4 carbon atoms, z represents an integer of from 2 to 30 and y represents an integer of from 1 to 30, $R_3$ represents a group of the general formula $$-NH-R_5-\underset{\underset{R_6}{|}}{N}-$$

in which $R_5$ and $R_6$ have the meanings indicated above, said polyester amides having relative solution viscosities $\eta_{rel.}$ in the range of 1.0 to 4.0 (determined on solutions of 1 g of substance in 100 ml of m-cresol at 25° C).

The antistatic polyamide compositions according to the invention are obtained by adding 1 to 30 percent by weight, based on the polyamide composition, of polyester amides which have recurrent structural units of the general formulae $$\left[\begin{array}{c}-C-R_1-C-R_2-\\ \parallel\quad\quad\parallel\\ O\quad\quad O\end{array}\right] \text{ and } \left[\begin{array}{c}-C-R_1-C-R_3-\\ \parallel\quad\quad\parallel\\ O\quad\quad O\end{array}\right],$$

wherein $R_1$, $R_2$ and $R_3$ have the meanings indicated above and which have solution viscosities in the range of 1.0 to 4.0 to solvent-free melts of linear aliphatic polyamides.

The aliphatic polyamides which are used in the antistatic polyamide compositions according to the invention are linear polyamides or copolyamides consisting of recurrent structural units of the general formulae

wherein $R_7$ represents a straight chain or branched chain alkylene group containing 4 to 20 carbon atoms, $R_8$ represents a straight chain or branched chain alkylene group, a 1,4-cyclohexylene group or a group of the formulae

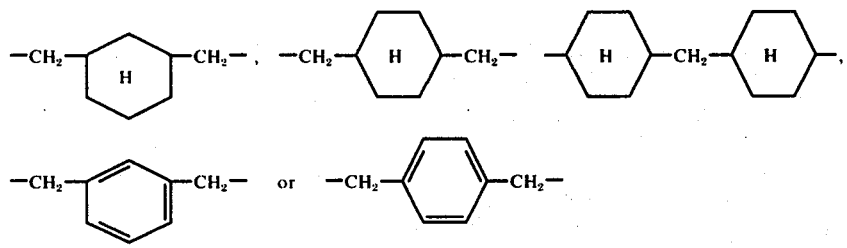

and $R_9$ represents a straight chain or branched chain alkylene group containing 3 to 20 carbon atoms.

Polycaprolactam and polyamide 66 are particularly preferred starting materials for producing the antistatic polyamide compositions.

Addition of the polyester amides to the polyamides may be carried out as desired, e.g. by stirring them into the solvent-free melt. According to a preferred method, the melted polyester amide is added to the polyamide melt at the required concentration by supplying it from an extruder with dosing device before the shaping operation. Processing of the melts to produce shaped products such as fibres or foils is not impaired by the additives.

Preparation of the polyester amides used as antistatic additives according to the invention is carried out by polycondensation of a stoichiometric mixture of a dicarboxylic acid derivative of the general formula

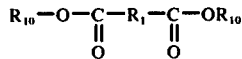

wherein $R_{10}$ represents a hydrogen atom or a short chain alkyl group containing 1 to 4 carbon atoms and $R_1$ has the meaning indicated above and a d of the general formula H-$R_2$-H wherein $R_2$ has the meaning indicated above together with a primary-secondary diamine of the general formula

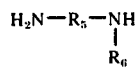

in which $R_5$ and $R_6$ have the meanings already indicated.

The temperature should be chosen to enable polycondensation to be achieved within a reasonable time. Condensation is generally carried out at 50° to 300° C at pressures of between 20 excess atmospheres and 0.001 mm.Hg.

According to a preferred method of carrying out the process, the diol and dicarboxylic acid derivative are first precondensed by known processes at a molar ratio of diol to dicarboxylic acid derivative of 1:2. After addition of the diamine, polycondensation is then carried out until the desired viscosity is reached. In order to obtain a particular viscosity, one of the components, i.e. the dicarboxylic acid derivative, diol or diamine, may be added in a quantity different from the stoichiometric quantity so that a lower average molecular weight results. Alternatively, monofunctional compounds such as monocarboxylic acids, alcohols or amines may be used; this method ensures that the polyester amides will not have reactive end groups. Any re-arrangement of the amide groups on addition to the polyamides and their incorporation in the polymer chains thereby becomes more difficult.

Catalyst are advantageously used for preparing the polyester amides. Known etherification catalysts such as zinc acetate, antimony trioxide, germanium dioxide, and the like are suitable for this purpose. Stabilisers and oxidation inhibitors such as sterically hindered phenols or hypophosphorous acid are also added to prevent degradation of the melt by heat or oxidation.

The following are examples of suitable diols for the preparation of the polyester amides: ethylene glycol, di-, tri-, tetra- and octa-ethylene glycol, propane-1,3-diol, butane-1,3-diol, butane-1,4-diol, 2,2-dimethylpropane-1,3-diol, hexane-1,6-diol, 2,2,4- and 2,4,4-trimethylhexane-1,6-diol, octadecane-1,12-diol, cyclohexane-1,4-diol, 1,4-bis-hydroxymethyl cyclohexane, 2,2-bis-(4-hydroxycyclohexyl)-methane, 2,2-bis-(4-hydroxycyclohexyl)-propane, polyether diols such as polytetrahydrofurans, polyethylene glycols and N,N'-ethoxylated disecondary diamines such as N,N'-bis-($\beta$-hydroxyethyl)-piperazine.

N-methyl ethylenediamine, N-methyl diaminopropane, N-isopropyl diaminohexane and N-isobutyl diaminohexane are examples of primary-secondary diamines which may be used for preparing the polyester amides.

The following are examples of dicarboxylic acids and their derivatives which may be used for preparing the polyester amides: oxalic acid, succinic acid, adipic acid, sebacic acid, decane-1,10-dicarboxylic acid, cyclohexane-1,4-dicarboxylic acid, isophthalic acid, terephthalic acid and their dimethyl or diethyl esters. The reaction time for preparing the polyester amides is between 30 minutes and 20 hours. The reaction is carried out under an inert gas such as nitrogen. After condensation at excess or normal pressure, the pressure may be reduced, generally to below 15 mm.Hg. This evacuation is particularly suitable for degasifying the melt.

The antistatic compositions according to the invention can be worked up into foils and threads by the usual processes.

The relative solution viscosities $\eta_{rel.}$ given in the following examples were determined at 25° C on solutions of 1 g of substance in 100 ml of m-cresol.

The following examples are to further illustrate the invention without limiting it.

EXAMPLE 1

A mixture of 174 parts by weight of dimethyladipate, 143 parts by weight of octadecane-1,12-diol and 0.45 parts by weight of zinc acetate in a 500 ml three-necked flask equipped with stirrer, gas inlet tube and distillation head is slowly heated on a metal bath under an atmosphere of nitrogen so that there is constant formation of condensate. From the time when the temperature reaches 250° C, stirring is continued for 30 minutes at a pressure of 18 mm.Hg. The precondensate is cooled to 90° C, 44 parts by weight of N-methyl-diaminopropane and 3.6 parts by weight of 50% hypophosphorous acid are added, and the reaction mixture is slowly heated to 250° C with a 30 cm distillation column attached to the flask. Thereafter, the reaction mixture is again evacuated for 30 minutes. A polycondensate which is a thin liquid when hot and highly viscous at room temperature with $\eta_{rel.} = 1.36$ is obtained.

3.5 parts by weight of the polyester amide are introduced into the above described apparatus at 270° C together with 66.5 parts by weight of a polycaprolactam granulate which has a viscosity of $\eta_{rel.} = 2.70$, and the mixture is melted and stirred until homogeneous. From this mixture, threads are drawn which are stretched to 4.5 times their length. Their electric surface resistance is measured by means of a commercial high resistance ohmmeter after 48 hours' conditioning in a standard atmosphere of 23° C and 50% relative humidity (8 . $10^{10}$ Ohm as compared with 7 . $10^{12}$ Ohm without additive). The threads are then washed in a washing machine with 5 g per liter of an alkaline detergent at 60° C and again conditioned in a standard atmosphere for 48 hours. The surface resistance measured after 10 washings is 9 . $10^{10}$ Ohm.

EXAMPLE 2

258.4 parts by weight of diethyl sebacate, 45 parts by weight of butane-1,4-diol and 0.45 parts by weight of zinc acetate are condensed under nitrogen at 250° C in the apparatus described above. After cooling, 86 parts by weight of N-isobutyl-1,6-diaminohexane and 3.9 parts by weight of 50% hydrophosphorous acid are added and polycondensation is continued to a temperature of 250° C, followed by 30 minutes' degasification of the melt at 17 mm.Hg. A cloudy, viscous paste which has a relative viscosity of 1.46 is obtained.

6 percent by weight of the polyester amide, based on the weight of polycaprolactam, are supplied from a feed screw to a solvent-free melt of polycaprolactam ($\eta_{rel.} = 2.70$) in a double shaft extruder, and the mixture is then spun to form a yarn of 85 den. After stretching and one washing, the threads have a surface resistance of 6 . $10^{10}$ Ohm, and after the tenth washing they have a surface resistance of 1 . $10^{11}$ Ohm.

EXAMPLE 3

A precondensate is prepared from 174 parts by weight of dimethyl adipate, 31 parts by weight of ethylene glycol and 0.31 parts by weight of zinc acetate by the method described in Example 1, and from this precondensate a polyester amide ($\eta_{rel.} = 1.28$) is obtained after the addition of 44 parts by weight of N-methyl-1,3-diaminopropane and 2.5 parts by weight of 50% hypophosphorous acid. The product is a slightly cloudy, viscous oil at room temperature. It is added to a polyamide-66-melt ($\eta_{rel.} = 2.45$) in an amount of 7 percent by weight, based on the polyamide, as described in Example 2. When the threads have been stretched 4-fold and washed once, they have a surface resistance of 5 . $10^{10}$ Ohm, and after 10 washings they have a surface resistance of 7 . $10^{10}$ Ohm. Untreated polyamide 66 has a surface resistance of 9. $10^{12}$ Ohm after one washing and 1 . $10^{13}$ Ohm after ten washings.

EXAMPLE 4

146 parts by weight of adipic acid, 59 parts by weight of hexane-1,6-diol and 0.31 parts by weight of zinc acetate as well as 79 parts by weight of N-isopropyl-1,6-diaminohexane and 2.9 parts by weight of 50 % hypophosphorous acid are condensed by a two-stage process as in the previous examples at 250° C and under vacuum degasification to produce a polyester amide with a viscosity of $\eta_{rel.} = 1.37$.

100 denier filaments obtained from polycaprolactam ($\eta_{rel.} = 2.70$) to which 5 percent by weight of the polyester amide has been added in a double shaft extruder is found to have a surface resistance of 8 . $10^{10}$ Ohm after the first washing and 7 . $10^{10}$ Ohm after the tenth washing ($\eta_{rel.}$ of the threads: 2.64).

EXAMPLE 5

258.5 parts by weight of diethyl sebacate, 31 parts by weight of ethylene glycol and 0.3 parts by weight of zinc acetate followed by 79 parts by weight of N-isopropyl-1,6-diaminohexane and 3.7 parts by weight of 50 % hypophosphorous acid are condensed in a two-stage process to produce a polyester amide ($\eta_{rel.} = 1.43$) which is a pale yellowish, viscous paste.

Addition of 7 % of this paste to polyamide 66 which is then spun and stretched to 4.5 times its length results in threads which have a surface resistance of 9 . $10^{10}$ Ohm and 1 . $10^{11}$ Ohm after the first and tenth washing, respectively ($\eta_{rel.}$ before addition 2.45, after addition, 2.36).

EXAMPLE 6

A colourless polyester amide which is very viscous at room temperature is obtained by a two-stage condensation from 174 parts by weight of dimethyl adipate, 185 parts by weight of octaethylene glycol and 0.54 parts by weight of zinc acetate followed by 44 parts by weight of N-methyl-1,3-diaminopropane and 4 parts by weight of 50 % hypophosphorous acid.

Threads of polycaprolactam which contain 6 percent by weight of the polyester amide have a surface resistance of 9 . $10^{9}$ Ohm and 5 . $10^{10}$ Ohm after the first and tenth washing, respectively.

EXAMPLE 7

174 parts by weight of dimethyl adipate, 59 parts by weight of hexane-1,6-diol, 0.35 parts by weight of zinc acetate, 37 parts by weight of N-methyl-ethylene diamine and 2.7 parts by weight of 50 % hypophosphorous acid are condensed as described in Example 2.

Threads of polycaprolactam containing 5 percent by weight of the polyester amide have a surface resistance of $6 \cdot 10^{10}$ and $1 \cdot 10^{11}$ Ohm after the first and 10th washing, respectively.

EXAMPLE 8

230 parts by weight of decane-1,10-dicarboxylic acid, 59 parts by weight of hexane-1,6-diol and 0.3 parts by weight of zinc acetate are precondensed under nitrogen at 250° C in the apparatus described above. 44 parts by weight of N-methyl-1,3-diaminopropane, 3.3 parts by weight of 50 % hypophosphorous acid and 8 parts by weight of N-methyl stearylamine (used to adjust the molecular weight) are then added, and a polyester amide which has a relative viscosity of $\eta_{rel.} = 1.21$ is obtained as a viscous product at 250° C.

Polycaprolactam threads which contain 8 percent by weight of the polyester amide have a surface resistance of $4 \cdot 10^{10}$ Ohm and $8 \cdot 10^{10}$ Ohm after the first and tenth washing, respectively.

EXAMPLE 9

194 parts by weight of dimethyl isophthalate, 143 parts by weight of octadecane-1,12-diol and 0.51 parts by weight of zinc acetate are precondensed at 270° C. Condensation is then continued at 270° C after the addition of 79 parts by weight of N-isopropyl-1,6-diaminohexane, 10 parts by weight of dodecanoic acid and 4.3 parts by weight of 50 % hypophosphorous acid, and a polyester amide is obtained in the form of a brittle, glassy product ($\eta_{rel.} = 1.61$).

Threads of polycaprolactam containing 10 percent by weight of a polyester amide have a surface resistance of $1 \cdot 10^{11}$ Ohm and $2 \cdot 10^{11}$ Ohm after the first and tenth washing, respectively.

EXAMPLE 10

194 parts by weight of dimethyl terephthalate, 185 parts by weight of octaethylene glycol and 0.57 parts by weight of zinc acetate followed by 44 parts by weight of N-methyl-1,3-diaminopropane, 8 parts by weight of methyl stearate and 4.3 parts by weight of 50 % hypophosphorous acid are condensed in a two-stage process at 270° C. The polyester amide is a glassy brittle and colourless product ($\eta_{rel.} = 1.54$).

Threads of polyamide 66 containing 1C percent by weight of this polyamide have a surface resistance of $2 \cdot 10^{10}$ Ohm after the first and tenth washing.

We claim:

1. Antistatic polyamide composition consisting essentially of aliphatic polyamide and 1 - 30 percent by weight, based on the polyamide composition, of a polyester amide containing alkylated amide groups which has recurring structural units of both the general formulae

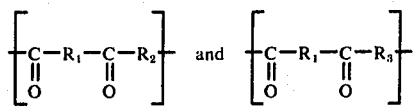

in statistical distribution,
wherein
  $R_1$ represents a single bond, or a divalent radical containing up to 10 carbon atoms selected from the group consisting of a straight chain alkylene, branched chain alkylene, cycloalkylene group and arylene;
  $R_2$ represents the groups $-O-R_4-O-$,

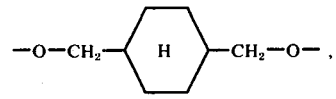

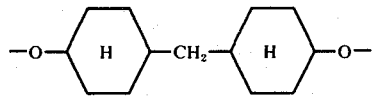

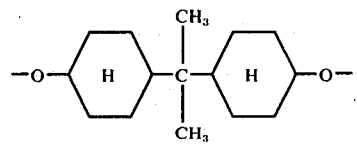

or the group of the general formula $-O-R_4-O-$ together with the group of the general formula

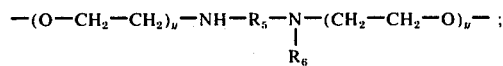

wherein
  $R_4$ represents a straight chain or branched chain alkylene group or a 1,4-cycloalkylene group; $R_5$ represents a straight chain or branched chain alkylene group containing 2 to 20 carbon atoms in which the chain may also contain tertiary nitrogen atoms;
  $R_6$ represents a short chain straight or branched alkyl group containing 1 to 4 carbon atoms; z represents an integer of from 2 to 30 and y represents an integer of from 1 to 30;
  $R_3$ represents a group of the general formula

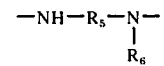

in which $R_5$ and $R_6$ have the meanings already indicated
said polyester amides having relative solution viscosities $\eta_{rel.}$ in the range of 1.0 to 4.0 (measured on solutions of 1 g of substance in 100 ml of m-cresol at 25° C).

2. Antistatic polyamide of claim 1 wherein
  $R_1$ is $-C_4H_8$;

$$R_2 \text{ is } -O-C_{11}H_{12}-\overset{\overset{\displaystyle C_6H_{13}}{|}}{CH}-O-\ ; \text{ and}$$

$R_3$ is 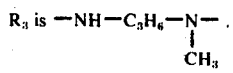

3. Antistatic polyamide of claim 1 wherein
$R_1$ is $-C_8H_{16}-$;
$R_2$ is $-O-C_4H_8-O-$; and $R_3$ is 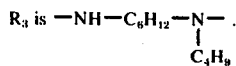

4. Antistatic polyamide of claim 1 wherein
$R_1$ is $-C_4H_8-$;
$R_2$ is $-O-C_2H_4-O-$; and $R_3$ is 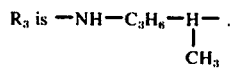

5. Antistatic polyamide of claim 1 wherein
$R_1$ is $-C_4H_8-$;
$R_2$ is $-O-C_6H_{12}-O-$; and $R_3$ is 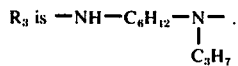

6. Antistatic polyamide of claim 1 wherein
$R_1$ is $-C_8H_{16}-$;
$R_2$ is $-O-C_2H_4-O-$; and $R_3$ is 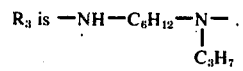

7. Antistatic polyamide of claim 1 wherein
$R_1$ is $-C_4H_8-$;
$R_2$ is $-O-C_6H_{12}-O-$; and $R_3$ is 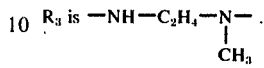

8. Antistatic polyamide of claim 5 wherein
$R_1$ is $-C_{10}H_{20}-$;
$R_2$ is $-O-C_6H_{12}-O-$; and $R_3$ is 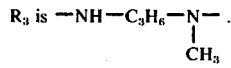

9. Antistatic polyamide of claim 1 wherein

$R_1$ is 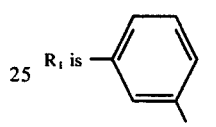;

$R_2$ is $-O-C_{11}H_{22}-\underset{\underset{C_6H_{13}}{|}}{CH}-O$; and $R_3$ is $NH-C_6H_{12}-\underset{\underset{CH_3}{|}}{N}-$.

10. Threads and foils of polyamide compositions according to claim 1.

* * * * *